(12) United States Patent
Gupta et al.

(10) Patent No.: US 10,539,086 B2
(45) Date of Patent: Jan. 21, 2020

(54) SYSTEMS AND METHOD FOR A COLD START SYSTEM FOR A GASEOUS FUEL ENGINE

(71) Applicant: Cummins Inc., Columbus, IN (US)

(72) Inventors: Ashish Shankar Gupta, Columbus, IN (US); J. Steven Kolhouse, Columbus, IN (US)

(73) Assignee: Cummins Inc., Columbus, IN (US)

(*) Notice: Subject to any disclaimer, the term of this patent is extended or adjusted under 35 U.S.C. 154(b) by 0 days.

(21) Appl. No.: 15/843,621

(22) Filed: Dec. 15, 2017

(65) Prior Publication Data

US 2019/0186397 A1    Jun. 20, 2019

(51) Int. Cl.
*F02D 41/06* (2006.01)
*F02B 19/12* (2006.01)
*F02P 5/15* (2006.01)

(52) U.S. Cl.
CPC .......... *F02D 41/064* (2013.01); *F02B 19/12* (2013.01); *F02P 5/1506* (2013.01); *F02D 41/065* (2013.01); *F02D 2200/023* (2013.01)

(58) Field of Classification Search
CPC .......... F02D 41/064; F02D 2200/023; F02D 41/065; F02P 5/1506; F02B 19/12
See application file for complete search history.

(56) References Cited

U.S. PATENT DOCUMENTS

| | | | |
|---|---|---|---|
| 3,808,818 A * | 5/1974 | Cataldo | F02B 75/02 123/1 R |
| 6,601,560 B1 | 8/2003 | Serve | |
| 6,990,946 B2 | 1/2006 | Goto | |
| 7,240,480 B1 * | 7/2007 | Brevick | F01N 3/0842 123/295 |
| 2008/0017165 A1 * | 1/2008 | Schubert | F02B 19/12 123/254 |
| 2010/0175664 A1 * | 7/2010 | Genslak | F02D 41/0205 123/406.23 |
| 2015/0219027 A1 * | 8/2015 | zur Loye | F02D 41/0027 60/603 |

FOREIGN PATENT DOCUMENTS

| | | |
|---|---|---|
| WO | 2010128127 A2 | 11/2010 |
| WO | 2015120549 A1 | 8/2015 |

* cited by examiner

*Primary Examiner* — Xiao En Mo
(74) *Attorney, Agent, or Firm* — Taft Stettinius & Hollister LLP

(57) ABSTRACT

Apparatuses, methods, and systems for starting an internal combustion engine under cold start conditions are disclosed. A combustible mixture is supplied to a plurality of cylinders of the internal combustion engine, where a number of ignition devices are operably connected with less than all of the plurality of cylinders so that at least one of the plurality of cylinders does not include an ignition device. In one form, only one ignition device is included in a bank of cylinders. In response to a cold start condition, a spark by the plurality of ignition devices is generated to cause ignition of the combustible mixture and start the internal combustion engine. In response to a normal or non-cold starting condition, the internal combustion engine is started by compression ignition where none of the ignition devices generate a spark.

13 Claims, 3 Drawing Sheets

SYSTEMS AND METHOD FOR A COLD START SYSTEM FOR A GASEOUS FUEL ENGINE

TECHNICAL FIELD

This disclosure relates generally to internal combustion engines, and more particularly is concerned with a cold start system for a gaseous fuel type internal combustion engines.

BACKGROUND

Gaseous fuel engines often encounter difficulties during cold start and low temperature conditions. When the engine is cold, the walls of the pre-combustion or combustion chambers are cold and act as a heat sink and impair the combustion characteristics of the engine, leading to poor starting performance.

To overcome the cold start and low temperature conditions, a spark plug is typically provided in every cylinder of the engine to ignite the fuel in these conditions. However, during warmed up or normal start conditions or normal temperature conditions, the engine does not require the use of the spark plugs to ignite the fuel. Therefore, the spark plugs are not utilized during the normal start conditions. As can be appreciated, engines are often started under normal conditions than cold start conditions. However, the spark plugs must still be provided for possible cold start conditions which add to the cost and complexity of the engine. Thus, there remains a need for additional improvements in systems and methods for cold start conditions.

SUMMARY

There is disclosed an internal combustion engine system that includes an engine having a plurality of cylinders and a number of ignition devices, wherein the number of ignition devices is assembled with the plurality of cylinders such that less than all of the plurality of cylinders include at least one of the number of ignition devices in operable association therewith to ignite a fuel in the associated cylinder. Also disclosed is a technique to supply a combustible mixture to a plurality of cylinders of an internal combustion engine, wherein a number of ignition devices are operably connected with less than all of the plurality of cylinders so that at least one of the plurality of cylinders does not include an ignition device, generating a spark by the plurality of ignition devices to cause ignition of the combustible mixture in response to a cold start condition, and starting the internal combustion engine. Also disclosed is a technique of starting an internal combustion engine that includes evaluating a starting condition of the internal combustion engine with a control system of the internal combustion engine, wherein the internal combustion engine has a plurality of cylinders and a number of ignition devices, wherein the number of ignition devices is assembled with the plurality of cylinders such that less than all of the plurality of cylinders include at least one of the number of ignition devices in operable association therewith, in response to determining a cold start starting condition, generating a spark with the number of ignition devices to start the internal combustion engine, and in response to determining the cold start condition does not exist, starting the internal combustion engine by compression ignition. The technique includes less than half of the plurality of cylinders including one of the number of ignition devices in operable association therewith and the normal start condition does not include generating any spark with the number of ignition devices.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION

Figure 1:
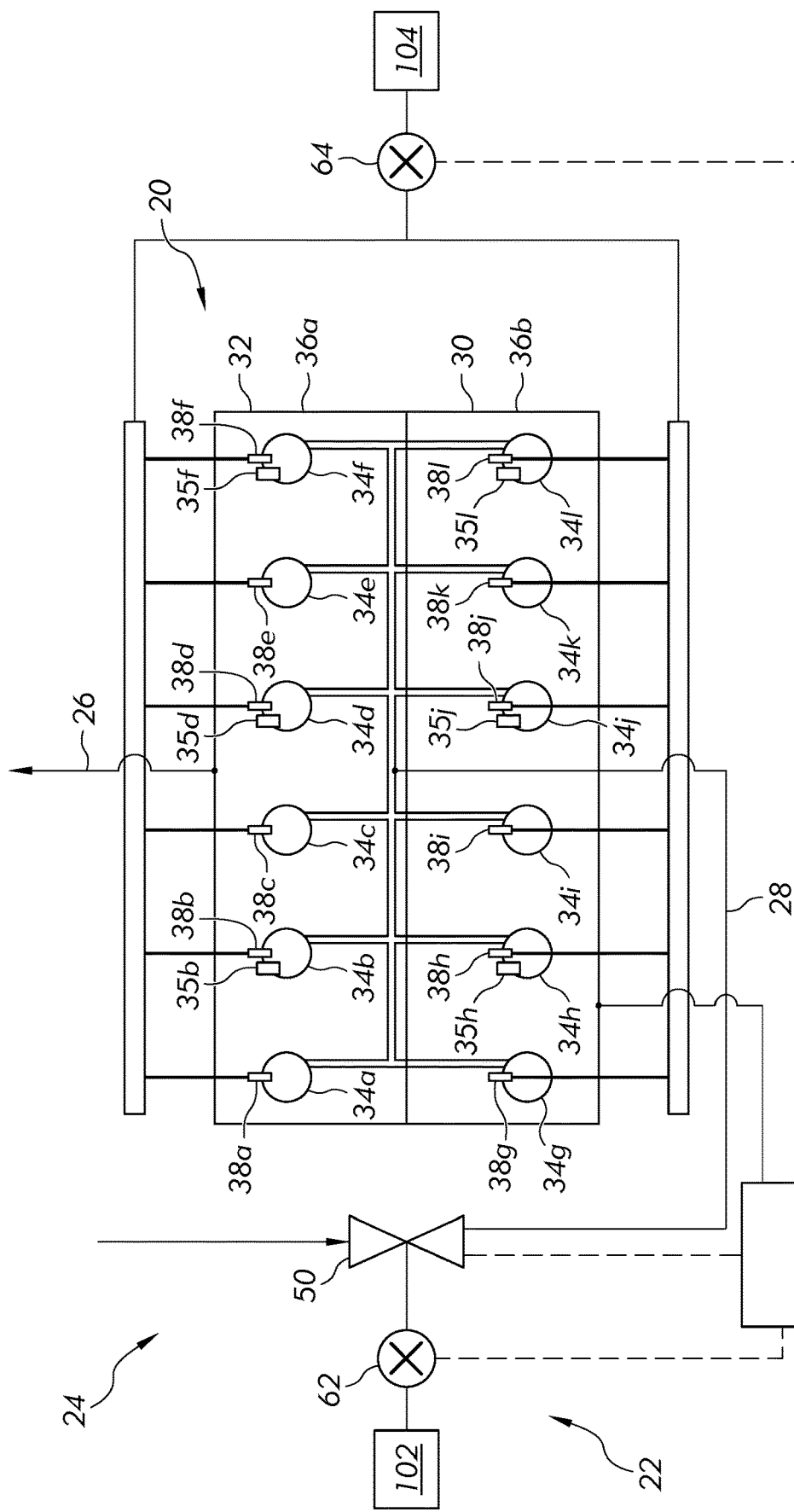
FIG. 1 is a schematic illustration of one embodiment of a portion of an internal combustion engine system with a number of ignition devices.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, an internal combustion engine system 20 is illustrated in schematic form. In certain forms, internal combustion engine system 20 is a single-fuel engine system such as a spark ignited engine structured to combust gaseous hydrocarbon fuel. Examples of gaseous hydrocarbon fuels (sometimes referred to herein generally as gas) include a variety of types of natural gas and other gaseous hydrocarbons, for example, pipeline gas, wellhead gas, producer gas, field gas, nominally treated field gas, well gas, nominally treated well gas, bio-gas, methane, ethane, propane, butane, liquefied natural gas (LNG), compressed natural gas, landfill gas, condensate, or coal-bed methane (CBM). In such forms, fueling system 22 is operable with internal combustion engine system 20 to provide fueling for engine 30 from a first fuel source 102 which provides a supply of gaseous fuel for combustion by compression ignition by internal combustion engine system 20. In such forms fuel source 102 is the sole fuel source and may be configured so that the fuel is pre-mixed with the charge flow upstream of the combustion chambers of engine cylinders. In certain forms, internal combustion system 20 is structured as a micro pilot fuel engine system, for example an engine structured to combust main gaseous fuel by spark ignition for starting purposes under cold start conditions, and combust main gaseous fuel by igniting 'liquid fuel by compression ignition' after starting of the engine. In such forms, fueling system 22 includes a second fuel source 104 for providing a liquid fuel such as diesel fuel, other liquid fuels, or lubrication oil for combustion by internal combustion engine system 20.

Internal combustion engine system 20 includes engine 30 connected with an intake system 24 for providing a charge flow to engine 30 and an exhaust system 26 for output of exhaust gases in an exhaust flow. The engine 30 is provided as a spark ignited gas engine for ignition of a liquid fuel adapted to combust a gaseous fuel flow by compression ignition. The gaseous fuel can be, for example, any of the aforementioned types. In certain embodiments, engine 30 uses a liquid fuel in second fuel source 104 such as diesel fuel for micro pilot injection and act as a source for ignition of a gaseous fuel in first fuel source 102 such as natural gas. Again, the gaseous fuel can be any of the aforementioned types. In the illustrated embodiment, the engine 30 includes six cylinders 34a-34f in a first cylinder bank 36a and six cylinders 34g-34l in a second cylinder bank 36b arrangement. However, the number of cylinders (collectively and individually referred to as cylinder(s) 34) may be any number, and the arrangement of cylinders 34 unless noted otherwise may be any arrangement including an in-line arrangement, and is not limited to the number and arrangement shown in FIG. 1.

Engine 30 includes an engine block 32 that at least partially defines the cylinders 34. A plurality of pistons (not illustrated) may be slidably disposed within respective cylinders 34 to reciprocate between a top-dead-center position and a bottom-dead-center position while rotating a crankshaft (not illustrated). Each of the cylinders 34, its respective piston, and the cylinder head form a main combustion chamber (not illustrated). In the illustrated embodiment, engine 30 includes twelve such main combustion chambers. However, it is contemplated that engine 30 may include a greater or lesser number of cylinders 34 and main combustion chambers and that cylinders 34 and main combustion chambers may be disposed in an "in-line" configuration, a "V" configuration, or in any other suitable configuration. In some forms, each of the cylinders 34 includes a prechamber that is in fluid communication with the main combustion chamber.

In the embodiment illustrated in FIG. 1, less than all of the cylinders 34 include an ignition device 35. The ignition devices 35 can be operably disposed with the main combustion chamber or the prechamber of the cylinders 34. In FIG. 1, cylinders 34b, 34d, 34f, 34h, 34j, and 34l include the corresponding ignition devices 35b, 35d, 35f, 35h, 35j, and 35l, respectively. Ignition devices 35b, 35d, 35f, 35h, 35j, and 35l are in operable association to ignite fuel from the first fuel source 102 and/or the second fuel source 104. As can be appreciated, a greater number of cylinders 34 can include corresponding ignition devices 35. The ignition devices 35a-35l can be a spark plug, a diesel pilot ignition device, a plasma ignition device, a laser ignition device, a thermal ignition device, or a non-thermal ignition device.

Figure 2:
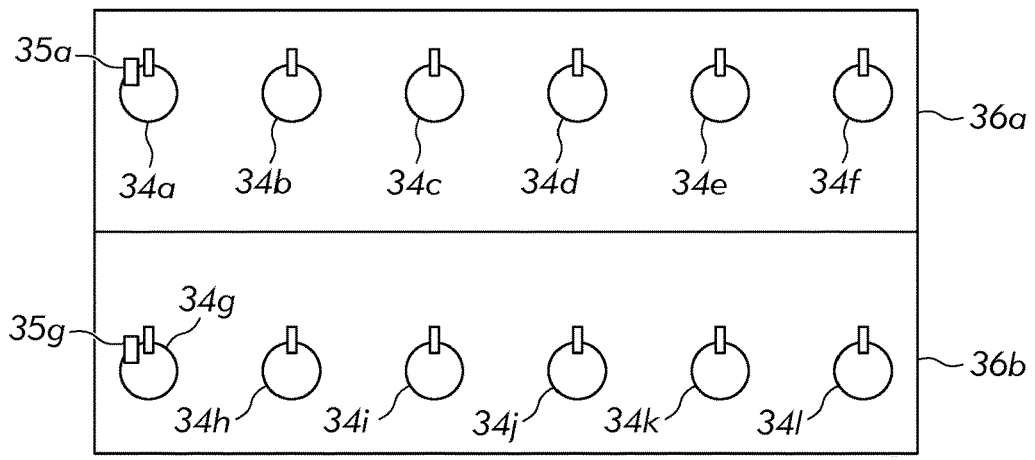
FIG. 2 is a schematic illustration of a second embodiment of cylinder banks with a number of ignition devices for use with the internal combustion engine system of FIG. 1.

In other embodiments, a fewer number of cylinders 34 can include corresponding ignition devices 35. For example, in FIG. 2, ignition device 35a is associated with cylinder 34a in the first cylinder bank 36a and ignition device 35g is associated with cylinder 34g in the second cylinder bank 36b. In FIG. 2, the remaining cylinders 34b-34f and 34h-34l do not have ignition devices associated with them therefore there is only one ignition device that being 35a associated with the first cylinder bank 36a and one ignition device that being 35g associated with the second cylinder bank 36b. The ignition devices 35 can be arranged in different cylinders 34 in each of the cylinder banks 36a and 36b. For example, in one form, ignition device 35b can be associated with cylinder 34b and ignition device 35h can be associated with cylinder 34h and the remaining cylinders 34 do not include any ignition devices 35. There may be other arrangements or configurations of the ignition devices 35.

Figure 3:
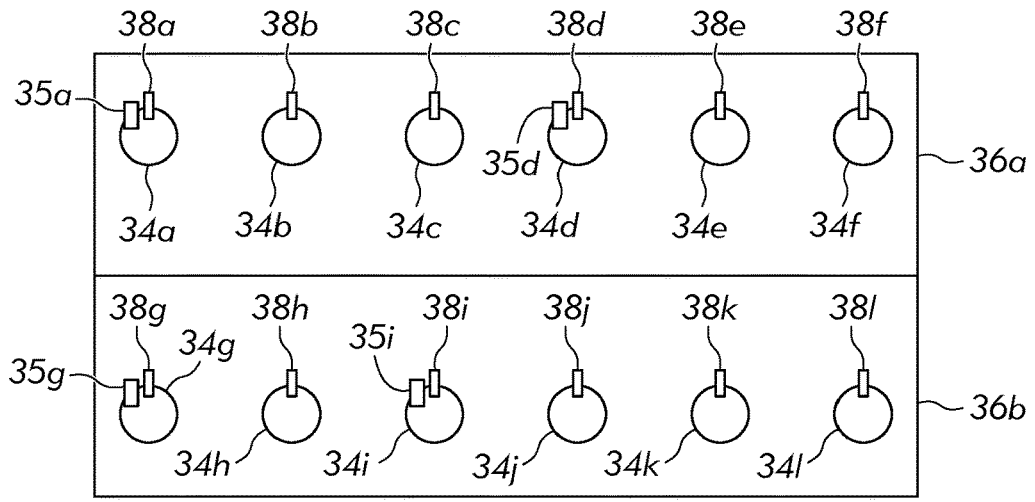
FIG. 3 is a schematic illustration of another embodiment of cylinder banks with a number of ignition devices for use with the internal combustion engine system of FIG. 1.

In yet another arrangement in FIG. 3, ignition devices 35a, 35d are associated with cylinders 34a, 34d, respectively, in the first cylinder bank 36a and ignition devices 35g, 35i are associated with cylinders 34g, 34i in the second cylinder bank 36b. In FIG. 3, the remaining cylinders 34b, 34c, 34e, 34f and 34h, 34j-34l do not have ignition devices associated with them. As such, there are two ignition devices associated with the first cylinder bank 36a and two ignition devices associated with the second cylinder bank 36b. In other forms, the ignition devices 35 can be arranged in a different configuration in each of the cylinder banks 36a and 36b.

Figure 4:
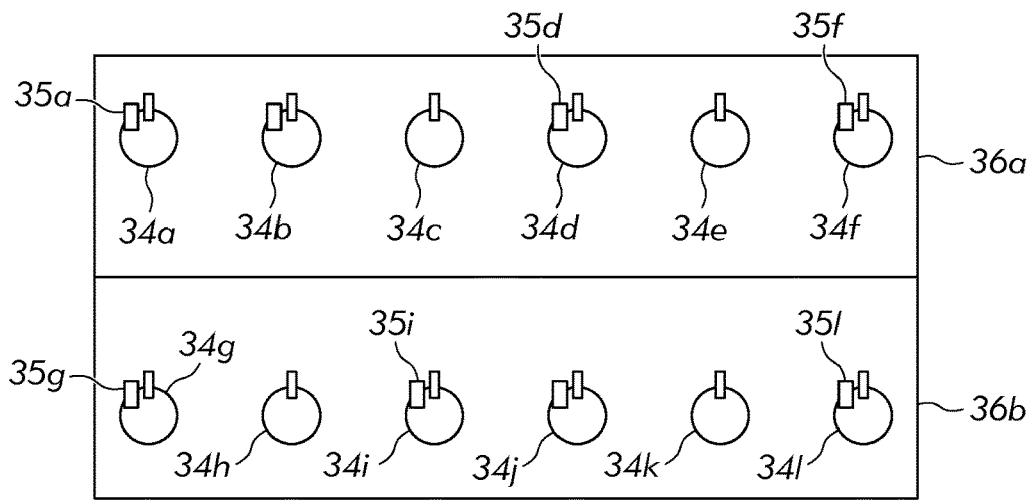
FIG. 4 is a schematic illustration of another embodiment of cylinder banks with a number of ignition devices for use with the internal combustion engine system of FIG. 1.

In yet another arrangement in FIG. 4, ignition devices 35a, 35d, 35f are associated with cylinders 34a, 34d, 34f, respectively, in the first cylinder bank 36a and ignition devices 35g, 35i, 35l, are associated with cylinders 34g, 34i, 34l, respectively, in the second cylinder bank 36b. In FIG. 4, the remaining cylinders 34b, 34c, 34e, and 34h, 34j, 34k do not have ignition devices associated with them. As such, there are three ignition devices associated with the first cylinder bank 36a and three ignition devices associated with the second cylinder bank 36b. In other forms, the ignition devices 35 can be arranged in a different configuration in each of the cylinder banks 36a and 36b.

Moreover, in any embodiment, the number of ignition devices 35 in the first cylinder bank 36a may be the same as the number of ignition devices 35 in the second cylinder bank 36b. Alternatively, the number of ignition devices 35 in the first cylinder bank 36a may be less than or greater than the number of ignition devices 35 in the second cylinder bank 36b. There may be one or more cylinders 34 that do not have any ignition devices 35 associated with them positioned adjacent one of cylinders 34 that do have one of ignition devices 35 associated with it.

In one embodiment, engine 30 is a four stroke engine. That is, for each complete engine combustion cycle (i.e., for every two full crankshaft rotations), each piston of each cylinder 34 moves through an intake stroke, a compression stroke, a combustion or power stroke, and an exhaust stroke. Thus, during each complete combustion cycle for the depicted twelve-cylinder engine, there are twelve strokes during which air is drawn into individual combustion chambers from intake system 24 and twelve strokes during which exhaust gas is supplied to an exhaust manifold (not illustrated).

The engine 30 includes cylinders 34 connected to the intake system 24 to receive a charge flow and connected to exhaust system 26 to release exhaust gases produced by combustion of the primary and/or secondary fuels. Exhaust system 26 may provide exhaust gases to a turbocharger (not illustrated), although a turbocharger is not required. In still other embodiments, multiple turbochargers are included to provide high pressure and low pressure turbocharging stages that compress the intake flow.

Furthermore, exhaust system 26 can be connected to intake system 24 with one or both of a high pressure exhaust gas recirculation (EGR) system (not illustrated) and a low pressure EGR system (not illustrated). These EGR systems may each include a cooler and a bypass. In other embodiments, one or both of EGR systems are not provided. When provided, EGR system(s) provide exhaust gas recirculation to engine 30 in certain operating conditions. In any EGR arrangement during at least certain operating conditions, at least a portion of the exhaust output of cylinder(s) 34 is recirculated to the engine intake system 24.

Fuel system 22 may provide either fueling from a single fuel source or, in other embodiments, micro pilot fueling of engine 30 from second fuel source 104 in addition to main fueling from first fuel source 102. In one micro pilot fuel embodiment, fuel system 22 includes first fuel source 102 connected to intake system 24 with a mixer or connection 50 at or adjacent an inlet of a compressor (not illustrated). First fuel source 102 is configured to provide a flow of gaseous fuel to cylinders 34. Second fuel source 104 is connected to each of the cylinders 34 such as through respective ones of the direct injectors 38a-38l, and second fuel source 104 is configured to provide a flow of liquid fuel to cylinders 34 with one or more direct injectors 38a-38l at or near each of the cylinders 34 such as from a common rail. In the micro pilot fueling, less than 1% of the total fuel, wherein the total fuel includes fuel from the first fuel source 102 and fuel from the second fuel source 104, is from the second fuel source 104. In the illustrated embodiment, the cylinders 34 each include at least one direct injector 38a-38l for delivering fuel to the combustion chamber thereof from a liquid fuel source, such as first fuel source 102, but multiple direct injectors and/or port injectors are also possible.

A direct injector, as utilized herein, includes any fuel injection device that injects fuel directly into the cylinder volume (combustion chamber), and is capable of delivering fuel into the cylinder volume when the intake valve(s) and exhaust valve(s) are closed. The direct injector may be structured to inject fuel at the top of the cylinder or laterally of the cylinder. In certain embodiments, the direct injector may be structured to inject fuel into a combustion prechamber.

In the micro pilot fuel embodiments where the first fuel source 102 is a gaseous fuel and the second fuel source 104 is a liquid fuel, a control system including controller 100 is configured to control the flow of gaseous fuel from first fuel source 102 and the flow of liquid fuel from second fuel source 104 in accordance with engine speed, engine loads, intake manifold pressures, and fuel pressures, for example. A control system including controller 100 is configured to control the flow of gaseous fuel from first fuel source 102 in accordance with engine speed, engine loads, intake manifold pressures, and fuel pressures, for example, and provide a pilot injection of liquid fuel from second fuel source 104. The first fuel source 102 is independent of the second fuel source 104, and the controller 100 is configured to control the flow of gaseous fuel from the first fuel source 102 independently of the flow of liquid fuel from the second fuel source 104.

Ignition devices 35 are electrically connected with controller 100 to receive spark or firing commands that provide a spark in the respective cylinder 34 in accordance with a cold start condition as determined by the controller 100. If a cold start condition does not exist, then the ignition devices 35 will not receive any spark or firing commands.

Controller 100 can be connected to actuators, switches, or other devices associated with a first shutoff valve 62 operably connected to the first fuel source 102, a second shutoff valve 64 operably connected to the second fuel source 104, fuel pumps, ignition devices 35, and/or injectors 38 and configured to provide control commands thereto that regulate the amount, timing and duration of the flows of the gaseous and/or liquid fuels to cylinders 34, charge flow (if present), and exhaust flow (if present) to provide the desired operating conditions, cold start conditions, and normal start conditions.

As discussed above, the positioning of each of actuators, switches, or other devices associated with first and second shutoff valves 62 and 64, respectively, ignition devices 35, and/or injectors 38 can be controlled via control commands from controller 100. In certain embodiments of the systems disclosed herein, controller 100 is structured to perform certain operations to control generating a spark with the ignition devices 35 in cold start conditions, and the controller 100 is structured to perform certain operations to start the engine system 20 by compression ignition when the cold start condition does not exist.

In certain embodiments, the controller 100 forms a portion of a processing subsystem including one or more computing devices having memory, processing, and communication hardware. The controller 100 may be a single device or a distributed device, and the functions of the controller 100 may be performed by hardware or software. The controller 100 may be included within, partially included within, or completely separated from an engine controller (not shown). The controller 100 is in communication with any sensor or actuator throughout the systems disclosed herein, including through direct communication, communication over a datalink, and/or through communication with other controllers or portions of the processing subsystem that provide sensor and/or actuator information to the controller 100.

The controller 100 includes stored data values, constants, and functions, as well as operating instructions stored on computer readable medium. Any of the operations of exemplary procedures described herein may be performed at least partially by the controller 100. Other groupings that execute similar overall operations are understood within the scope of the present application. Modules may be implemented in hardware and/or on one or more computer readable media, and modules may be distributed across various hardware or computer implemented. More specific descriptions of certain embodiments of controller operations are discussed herein below.

Controller 100 may be structured to implement a cold start condition which shall now be further described. Cold start conditions can be determined in a variety of ways, and different criteria can be employed to make such a determination. For example, a temperature representative of air intake temperature can be employed to determine cold start conditions. Such a temperature can be ambient air temperature, controller temperature or actual air intake temperature. When the temperature representative of air intake temperature is below a first temperature threshold then cold start conditions exist. The temperature of the charge in the combustion chamber at the end of the compression stroke decreases as the air intake temperature decreases. Gaseous fuel temperature, liquid fuel temperature, and/or pilot fuel temperature can be monitored to determine if any of these temperatures is below a respective temperature threshold to assess a cold start condition.

Alternatively or additionally, engine oil temperature can be employed to determine cold start conditions. When the engine oil temperature is below an engine oil temperature threshold then cold start conditions exist. The viscosity of engine oil increases as its temperature decreases. During cold start conditions due to engine oil viscosity it takes significantly more battery power to crank the engine and as a result the crank speed decreases as engine oil temperature decreases.

Other temperatures can be employed to determine cold start conditions. Engine coolant temperature can be an indication of whether the engine has been recently running, thereby providing an indirect measure of engine oil temperature. When engine coolant temperature is below an engine coolant temperature threshold then cold start conditions exist. Generally speaking, engine oil temperature mostly varies with engine output, whereas engine coolant temperature varies with engine output, airflow and radiator capacity. As a result, engine oil temperature is largely unrelated to engine coolant temperature, except that when the oil temperature is warm it is likely that the coolant temperature is warm.

Controller temperature inputs can be employed to determine whether the engine was previously running, in which case controller temperature will be higher than ambient air temperature. Battery temperature can also be monitored to determine cold start conditions. When battery temperature is below a battery temperature threshold then cold start conditions exist. Battery internal resistance increases as temperature decreases, which decreases output voltage and battery capacity, thereby reducing battery power available for cranking the engine. In very cold operating environments, for example, the electrolyte in lead acid batteries has the danger of freezing so external heat sources may be employed to heat the battery, reducing the effectiveness of battery temperature alone as an indication of cold start.

Any one or combination of ambient air temperature, air intake temperature, battery temperature, engine coolant temperature, engine oil temperature, gaseous fuel temperature, liquid fuel temperature, and pilot fuel temperature being below a respective temperature threshold, within a certain temperature range, or meeting certain criteria can be used to determine whether a cold start condition exists.

Figure 5:
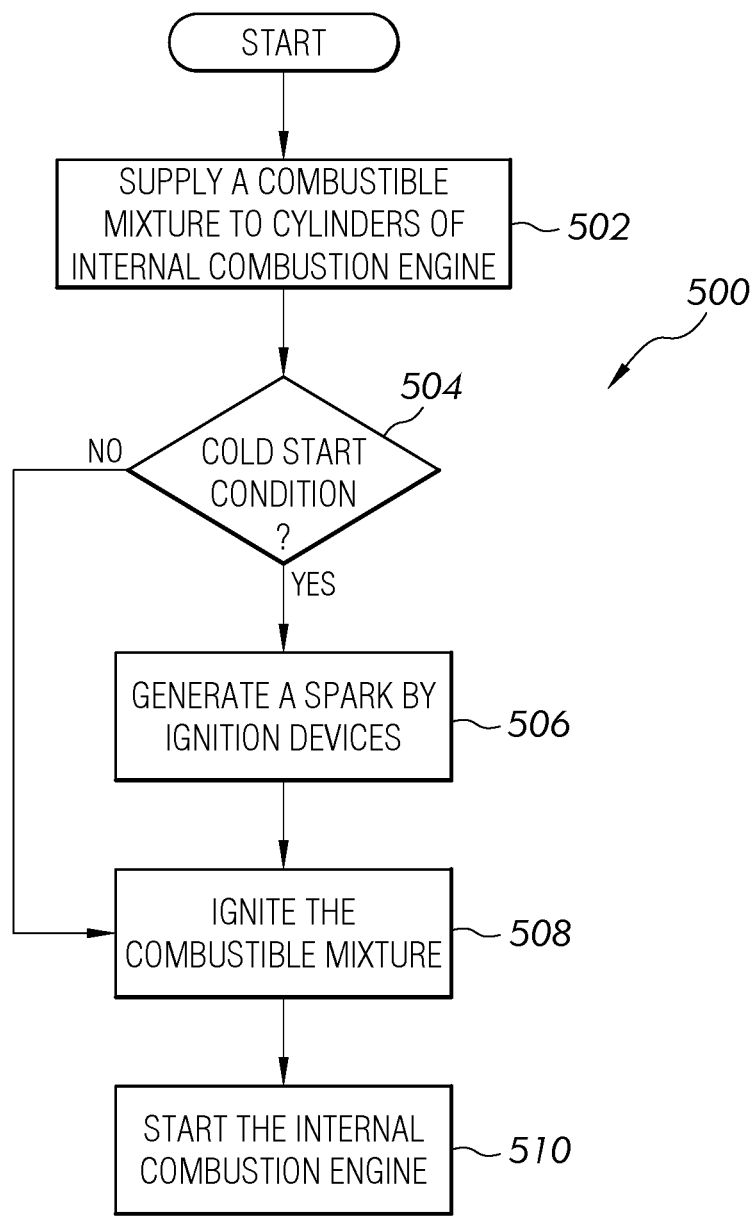
FIG. 5 is a schematic of a procedure for starting any one of internal combustion engines of FIGS. 1-4 in response to a cold start condition.

With reference to FIG. 5 there is illustrated exemplary control process 500 which may be implemented in an electronic controller such as controller 100. Control process 500 is suitable for use in internal combustion engine system 20. Control process 500 includes a number of control blocks and inputs which are examples of control operators which may be used in performing their respective functions which shall now be further described.

Control process 500 is initiated at supply block 502 which provides or supplies a combustible mixture to the cylinders 34 of the internal combustion engine system 20. The combustible mixture includes the first fuel source 102 and the second fuel source 104 as described previously. The control process 500 proceeds to cold start condition block 504 to determine if one or more of the cold start conditions described above are present. If the cold start condition from block 504 exists, then the control process 500 proceeds to spark block 506 which operates the ignition devices 35 to generate a spark. The control process 500 then proceeds to ignition block 508 and ignites the combustible mixture in the cylinders 34. If the cold start condition block 504 determines that none of the cold start conditions are present, then the process 500 proceeds to ignition block 508. Therefore, there are two techniques to ignite the combustible mixture in cylinders 34. If the cold start condition exists from block 504, then the combustible mixture is ignited with the spark from the ignition devices 35 that are provided in less than all of the cylinders 34. If the cold start condition does not exist from block 504, then the combustible mixture in all of the cylinders 34 is ignited by compression ignition. The control process 500 then proceeds to start block 510 that starts the engine 30.

Various aspects of the present disclosure are contemplated. According to one aspect, a system, comprising an internal combustion engine having a plurality of cylinders and a number of ignition devices, wherein the number of ignition devices is assembled with the plurality of cylinders such that less than all of the plurality of cylinders include at least one of the number of ignition devices in operable association therewith to ignite a fuel in the associated cylinder.

In one embodiment the system includes the plurality of cylinders including a first bank of cylinders and a second bank of cylinders, wherein the number of the ignition devices is arranged such that no more than half of the first bank of cylinders and no more than half of the second bank of cylinders include the ignition devices in operable association therewith.

In one embodiment the system includes the number of ignition devices is operably associated with less than half of the plurality of cylinders in an alternating sequence. In a further embodiment the system includes the alternating sequence includes a first cylinder that does not have one of the number of ignition devices in operable association with the first cylinder adjacent to a second cylinder that has one of the ignition devices in operable association with the second cylinder. In yet another embodiment the system includes the alternating sequence includes two or more cylinders that do not have the ignition devices in operable association therewith positioned near one cylinder that has one of the ignition devices in operable association with the one cylinder.

In one embodiment the system includes each of the less than all of the plurality of cylinders includes a main combustion chamber, and the number of ignition devices are operably disposed at least partially within the main combustion chambers.

In one embodiment the system includes each of the less than all of the plurality of cylinders includes a prechamber in fluid communication with a main combustion chamber, and the number of ignition devices are operably disposed within the prechambers.

In one embodiment the system includes the internal combustion engine includes a controller configured to control ignition of the number of ignition devices in response to a cold start condition of the internal combustion engine. In a further embodiment the system includes the controller is configured to determine the cold start condition in response to at least one of ambient air temperature, air intake temperature, battery temperature, controller temperature, engine coolant temperature, engine oil temperature, liquid fuel temperature, and gaseous fuel temperature being below a respective temperature threshold.

In one embodiment the system includes the internal combustion engine includes a fuel system having a first fuel source operable to provide a liquid fuel to the plurality of cylinders and a second fuel source operable to provide a gaseous fuel to the plurality of cylinders. In a further embodiment the system includes the liquid fuel is diesel fuel and the gaseous fuel is selected from the group consisting of natural gas, bio-gas, methane, propane, ethanol, producer gas, field gas, liquefied natural gas, compressed natural gas, or landfill gas. In a further embodiment the system includes the internal combustion engine includes a plurality of fuel injectors assembled with the plurality of cylinders, the plurality of fuel injectors configured to deliver at least the liquid fuel to the plurality of cylinders.

According to another aspect a method comprises supplying a combustible mixture to a plurality of cylinders of an internal combustion engine, wherein a number of ignition devices are operably connected with less than all of the plurality of cylinders so that at least one of the plurality of cylinders does not include an ignition device; generating a spark by the plurality of ignition devices to cause ignition of the combustible mixture in response to a cold start condition; and starting the internal combustion engine.

In one embodiment, the method includes one of the number of ignition devices is operably connected with every alternate one of the plurality of cylinders.

In one embodiment, the method includes only one of the number of ignition devices is operably connected with a corresponding one the plurality of cylinders.

In one embodiment, the method further includes controlling with a controller of the internal combustion engine the generating a spark by the plurality of ignition devices. In a further embodiment the method includes the cold start condition is determined in response to at least one of ambient air temperature, air intake temperature, battery temperature, controller temperature, engine coolant temperature, engine oil temperature, liquid fuel temperature, and gaseous fuel temperature being below a respective temperature threshold.

In one embodiment, the method includes the plurality of cylinders includes a first bank of cylinders and a second bank of cylinders, wherein the number of the ignition devices is arranged such that no more than half of the first bank of cylinders or half of the second bank of cylinders include the ignition devices in operable connection therewith.

Another aspect includes a method of starting an internal combustion engine comprises evaluating a starting condition of the internal combustion engine with a control system of the internal combustion engine, wherein the internal combustion engine has a plurality of cylinders and a number of ignition devices, wherein the number of ignition devices is assembled with the plurality of cylinders such that less than all of the plurality of cylinders include at least one of the number of ignition devices in operable association therewith; in response to determining a cold start starting condition, generating a spark with the number of ignition devices to start the internal combustion engine; and in response to determining the cold start condition does not exist, starting the internal combustion engine by compression ignition.

In one embodiment, the method includes less than half of the plurality of cylinders includes one of the number of ignition devices in operable association therewith and the normal start condition does not include generating any spark with the number of ignition devices.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
an internal combustion engine having a plurality of cylinders and a number of ignition devices, wherein the plurality of cylinders includes a first bank of cylinders and a second bank of cylinders, wherein the number of ignition devices is assembled with the first bank of cylinders such that less than all of the first bank of cylinders include at least one of the number of ignition devices to ignite a fuel in the associated cylinder, wherein the number of ignition devices is assembled with the second bank of cylinders such that less than all of the second bank of cylinders include at least one of the number of the ignition devices to ignite a fuel in the associated cylinder; and
a controller configured to control ignition of the number of ignition devices in response to a cold start condition of the internal combustion engine, and the controller configured to control ignition in all of the cylinders by compression ignition if the cold start condition does not exist.

2. The system of claim 1, wherein the number of the ignition devices is arranged such that no more than half of the first bank of cylinders and no more than half of the second bank of cylinders include the ignition devices.

3. The system of claim 1, wherein the number of ignition devices is less than half of the first bank of cylinders in an alternating sequence.

4. The system of claim 3, wherein the alternating sequence includes a first cylinder that does not have one of the number of ignition devices in operable association with the first cylinder adjacent to a second cylinder that has one of the ignition devices in operable association with the second cylinder.

5. The system of claim 3, wherein the alternating sequence includes two or more cylinders that do not have the ignition devices in operable association therewith positioned near one cylinder that has one of the ignition devices in operable association with the one cylinder.

6. The system of claim 1, wherein each of the less than all of the first bank of cylinders and each of less than all of the second bank of cylinders includes a main combustion chamber, and the number of ignition devices are operably disposed at least partially within the main combustion chambers.

7. The system of claim 1, wherein each of the less than all of the first bank of cylinders and each of less than all of the second bank of cylinders includes a prechamber in fluid communication with a main combustion chamber, and the number of ignition devices are operably disposed within the prechambers.

8. The system of claim 1, wherein the controller is configured to determine the cold start condition in response to at least one of ambient air temperature, air intake temperature, battery temperature, controller temperature, engine coolant temperature, engine oil temperature, liquid fuel temperature, and gaseous fuel temperature being below a respective temperature threshold.

9. The system of claim 1, wherein the internal combustion engine includes a fuel system having a first fuel source operable to provide a liquid fuel to the plurality of cylinders and a second fuel source operable to provide a gaseous fuel to the plurality of cylinders.

10. The system of claim 9, wherein the liquid fuel is diesel fuel and the gaseous fuel is selected from the group consisting of natural gas, bio-gas, methane, propane, ethanol, producer gas, field gas, liquefied natural gas, compressed natural gas, or landfill gas.

11. The system of claim 9, wherein the internal combustion engine includes a plurality of fuel injectors assembled with the plurality of cylinders, the plurality of fuel injectors configured to deliver at least the liquid fuel to the plurality of cylinders.

12. A system, comprising:
an internal combustion engine having a plurality of cylinders and a number of ignition devices, wherein the number of ignition devices is assembled with the plurality of cylinders such that less than all of the plurality of cylinders include at least one of the number of ignition devices in operable association therewith to ignite a fuel in the associated cylinder; and
a controller configured to control ignition of the number of ignition devices in response to a cold start condition of the internal combustion engine, and the controller configured to control ignition in all of the cylinders by compression ignition if the cold start condition does not exist.

13. The system of claim 12, wherein the controller is configured to determine the cold start condition in response to at least one of ambient air temperature, air intake temperature, battery temperature, controller temperature, engine coolant temperature, engine oil temperature, liquid fuel temperature, and gaseous fuel temperature being below a respective temperature threshold.

* * * * *